(12) United States Patent
Matsumoto et al.

(10) Patent No.: US 8,001,098 B2
(45) Date of Patent: Aug. 16, 2011

(54) DATABASE UPDATE MANAGEMENT (75) Inventors: Tatsuyuki Matsumoto, Tokyo (JP);
Tetsuya Nikami, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 11/957,957

(22) Filed: Dec. 17, 2007

(65) Prior Publication Data
US 2008/0154900 A1 Jun. 26, 2008

(30) Foreign Application Priority Data

Dec. 26, 2006 (JP) .................................. 2006-350653

(51) Int. Cl.
*G06F 17/30* (2006.01)
(52) U.S. Cl. ....................................................... 707/704
(58) Field of Classification Search ................... 707/704
See application file for complete search history.

(56) References Cited

U.S. PATENT DOCUMENTS

| | | | | |
|---|---|---|---|---|
| 6,438,558 | B1 * | 8/2002 | Stegelmann | 707/615 |
| 6,957,237 | B1 * | 10/2005 | Traversat et al. | 1/1 |
| 7,385,608 | B1 * | 6/2008 | Baldwin | 345/506 |
| 2004/0172424 | A1 | 9/2004 | Edelstein et al. | |
| 2006/0069861 | A1 * | 3/2006 | Amano | 711/114 |
| 2006/0074965 | A1 * | 4/2006 | Cunningham et al. | 707/102 |
| 2006/0085456 | A1 * | 4/2006 | Pickering | 707/100 |

FOREIGN PATENT DOCUMENTS

| | | |
|---|---|---|
| JP | 3014027 | 1/1991 |
| JP | 6059959 | 3/1994 |
| JP | 9-146815 | 6/1997 |
| JP | 10-049420 | 2/1998 |
| JP | 11065904 | 3/1999 |
| JP | 2000-020375 | 1/2000 |
| JP | 2004-062869 | 2/2004 |
| JP | 2005-122560 | 5/2005 |
| JP | 2005234945 | 9/2005 |
| JP | 2005-309653 | 11/2005 |
| JP | 2005-316632 | 11/2005 |

* cited by examiner

*Primary Examiner* — Charles Rones
*Assistant Examiner* — Yuk Ting Choi
(74) *Attorney, Agent, or Firm* — Schmeiser, Olsen & Watts; John Pivnichny (57) ABSTRACT

A method and system for managing a transaction for updating tables of a database. An access order specifying a temporal order for updating tables of the database is stored. A received data request specifies records to be updated in the database for the transaction. The records identified in the data request are copied from the database to a virtual data area. It is determined from a list of updated records that the records identified in the data request have been updated in the virtual data area. It is ascertained that each record identified in the data request has not been updated in the database since the records were copied to the virtual data area. The list of updated records is sorted according to the temporal order in the access list. The database is updated by replacing in the database the records identified in the sorted list.

20 Claims, 6 Drawing Sheets

DATABASE UPDATE MANAGEMENT

FIELD OF THE INVENTION

The present invention, in general, relates to an update management of databases, and in particular, the present invention relates to an update management for reducing the frequency of deadlocks which may occur in an update processing for a plurality of databases by a plurality of concurrent transactions.

BACKGROUND OF THE INVENTION

In performing an exclusive control over a plurality of databases, such a situation, namely, a deadlock, may occur that, for example, one transaction locks a database A while waiting for a database B to be unlocked, and another transaction locks the database B while waiting for the database A to be unlocked, and the processing never progresses forever. When a deadlock occurs, such a processing is generally taken that one transaction is aborted and another transaction is completed in order to resolve the deadlock, for example.

Conventionally, in order to reduce occurrence of such a deadlock, application developers have created applications in such a way that an update order of the plurality of databases is preliminarily determined and an update of the databases is performed in accordance with the order.

Figure 1:
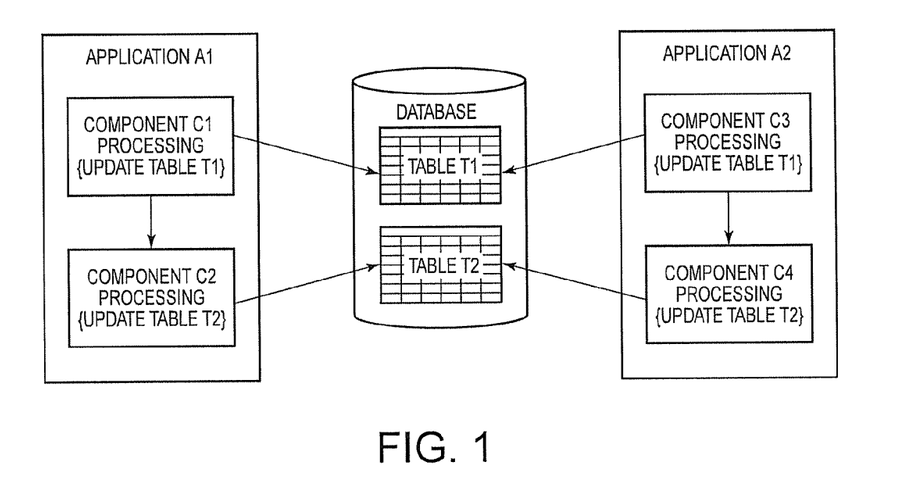
FIG. 1 illustrates a conventional method for avoiding a deadlock.

Referring to FIG. 1 to provide the more detailed description, when there are two databases, a table T1 and a table T2, application developers preliminarily determine that the tables T1 and T2 are updated in that order, and create all applications A1 and A2 which access to the databases to update the databases in that order. Thereby, that makes it possible to reduce the occurrence of the deadlock.

In recent years, the application development has been becoming more likely to create applications using existing components and resources. This is considered to be attributable that a component design has been pervading as an application developing method and that a service oriented architecture (SOA) has been suggested which achieves operations of customers with a flexible combination of services/components.

Figure 2:
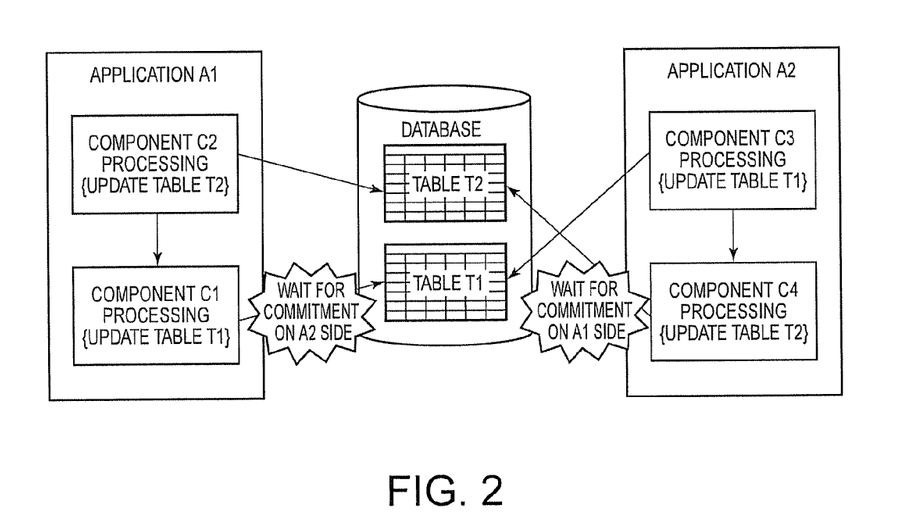
FIG. 2 illustrates a problem of the conventional method for avoiding the deadlock.

In such a component-based application development, an increase in the frequency of deadlocks is a problem in terms of data access implementation. The reason why the frequency of the deadlocks increases is that a flexible combination of components causes a change in an execution sequence, resulting in an inability to maintain consistency of an update order of databases. In the example shown in FIG. 1, the reshuffle of the execution sequence of components C1 and C2 in the application A1 causes inconsistency of the update order for the database as shown in FIG. 2, resulting in the occurrence of a deadlock.

The conventional fundamental strategy for avoiding the deadlock is, as described above, to create applications so that the update orders are standardized among the applications sharing the databases. However, it is difficult to secure this standardization of the order in SOA-based applications or component-based applications, which flexibly reshuffle the execution sequence in accordance with a change in operations.

Figure 3:
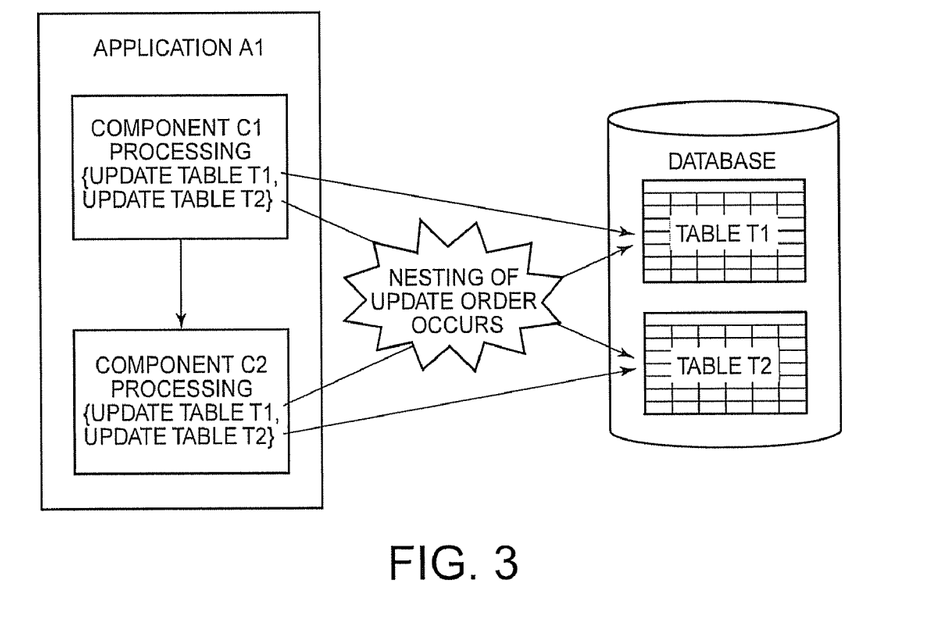
FIG. 3 illustrates the problem of the conventional method for avoiding the deadlock.

In addition, in the development per component, the update order within one component can be standardized, but it is not avoidable that the update order becomes a nesting structure as a whole if one processing is realized with a plurality of components, as shown in FIG. 3.

While the update order of the databases depends on a combination order of the components performing database accesses, it is difficult that a person who takes care of the combination of the components also comprehends contents of the data access within the components. Moreover, depending on the contents of the components, it may not be possible to standardize the update order regardless of the order of invoking the components.

SUMMARY OF THE INVENTION

The present invention provides a method for managing a transaction for updating tables of a database comprising a plurality of tables, said method performed by a database update management system by executing program code on a processor of an information processing apparatus, said database update management system comprising an access order storage unit and an updated data storage area, said method comprising:

storing, in the access order storage unit, an access order specifying a temporal order in which the tables of the plurality of tables are to be updated in the database;

after said storing the access order, receiving a data request specifying records to be updated in the database for the transaction, said records to be updated being comprised by the plurality of tables of the database;

after said receiving the data request, copying the records identified in the data request from the database to a virtual data area;

after said copying, determining from a list of updated records in the updated data storage area that the records identified in the data request have been updated in the virtual data area, said list of updated records specifying updated records of tables of the database in a chronological order in which the updated records have been updated in the virtual data area in accordance with the data request;

after said determining that the records identified in the data request have been updated in the virtual data area, ascertaining that each record identified in the data request has not been updated in the database since said copying was performed;

after said ascertaining, sorting the list of updated records in accordance with the temporal order in the access list to generate a list of sorted records in the updated data storage area; and updating the database by replacing in the database the records identified in the list of sorted records by corresponding updated records in the virtual data area, said records being replaced in the database in a time order corresponding to an order in which the updated records appear in the list of sorted records.

The present invention provides a database update management system comprising an access order storage unit and an updated data storage area, said system configured to perform a method for managing a transaction for updating tables of a database comprising a plurality of tables by executing program code on a processor of an information processing apparatus, said method comprising:

storing, in the access order storage unit, an access order specifying a temporal order in which the tables of the plurality of tables are to be updated in the database;

after said storing the access order, receiving a data request specifying records to be updated in the database for the transaction, said records to be updated being comprised by the plurality of tables of the database;

after said receiving the data request, copying the records identified in the data request from the database to a virtual data area;

after said copying, determining from a list of updated records in the updated data storage area that the records identified in the data request have been updated in the virtual data area, said list of updated records specifying updated records of tables of the database in a chronological order in which the updated records have been updated in the virtual data area in accordance with the data request;

after said determining that the records identified in the data request have been updated in the virtual data area, ascertaining that each record identified in the data request has not been updated in the database since said copying was performed;

after said ascertaining, sorting the list of updated records in accordance with the temporal order in the access list to generate a list of sorted records in the updated data storage area; and updating the database by replacing in the database the records identified in the list of sorted records by corresponding updated records in the virtual data area, said records being replaced in the database in a time order corresponding to an order in which the updated records appear in the list of sorted records.

The present invention provides a computer program product, comprising a computer usable storage medium having a computer readable program code stored therein, said computer readable program code containing instructions that when executed by a processor of an information processing apparatus implement a method for managing a transaction for updating tables of a database comprising a plurality of tables, said method comprising:

storing, in the access order storage unit, an access order specifying a temporal order in which the tables of the plurality of tables are to be updated in the database;

after said storing the access order, receiving a data request specifying records to be updated in the database for the transaction, said records to be updated being comprised by the plurality of tables of the database;

after said receiving the data request, copying the records identified in the data request from the database to a virtual data area;

after said copying, determining from a list of updated records in the updated data storage area that the records identified in the data request have been updated in the virtual data area, said list of updated records specifying updated records of tables of the database in a chronological order in which the updated records have been updated in the virtual data area in accordance with the data request;

after said determining that the records identified in the data request have been updated in the virtual data area, ascertaining that each record identified in the data request has not been updated in the database since said copying was performed;

after said ascertaining, sorting the list of updated records in accordance with the temporal order in the access list to generate a list of sorted records in the updated data storage area; and updating the database by replacing in the database the records identified in the list of sorted records by corresponding updated records in the virtual data area, said records being replaced in the database in a time order corresponding to an order in which the updated records appear in the list of sorted records.

DETAILED DESCRIPTION OF THE INVENTION

Hereinafter, the best mode for carrying out the present invention will be described in detail based on the drawings, but embodiments described below are not intended to limit the invention according to the claims, and all of the combinations of features described in the embodiments are not necessarily essential to means for solving the invention.

In addition, the present invention can be carried out in many different modes and should not be construed as limited to contents of description in the embodiments. It should also be noted that all of the combinations of the features described in the embodiments are not necessarily essential to means for solving the invention. The same numerals are given to same elements throughout the description in the embodiments.

The present invention provides a database update management system, a program, and a method, which can reduce a frequency of an occurrence of deadlocks which may occur in an update processing for a plurality of tables of a database by transactions.

The present invention to provides a database update management system, a program, and a method, which can update tables of a database without being conscious of the update order on the application side when it is required for the transactions to update the tables in a predetermined order, and realize the update in accordance with the order for the tables.

The present invention provides a database update management system for preventing an occurrence of a deadlock in an update processing for a plurality of tables of a database by a plurality of concurrent transactions. The database update management system includes: an access order storage unit for preliminarily storing an access order to the plurality of tables; a data request reception unit for receiving, from the transaction, a data request on data in the database to be updated; a data loading unit for loading the data from the database to a virtual data area; an updated data storage unit for storing information specifying the updated data in response to the data in the virtual data area being updated by the transaction; and a data sorting unit for sorting the stored information specifying the updated data in accordance with the access order in response to completion of the transaction. The update of the database is performed using the sorted information specifying the updated data, which makes it possible to separate securement of the consistency among the transactions regarding the update order of the tables from the transactions.

The data loading unit may load the data subjected to the data request from the database, every time the data request is received from the transaction. Alternatively, the data loading unit can be configured so as to collectively load all of the data requested by the transaction from the database, in response to initiation of the transaction.

The transaction updates the data loaded to the virtual data area. When the transaction includes a plurality of components, the same virtual data area can be used for the data requests from the components processing in the same transaction, which makes it possible to pass the data among the components processing in the same transaction.

It can be configured such that an update flag corresponding to the data is set in the updated data storage unit in accordance with the data loaded to the virtual data area being updated, which makes it possible to specify the updated data.

The database update management system can further include a lock management unit for determining whether or not the data loaded from the database is updated by other transactions. The lock management unit can be configured so as to have an updated time storage unit for storing an updated time of the acquired data in response to the data subjected to the data request being loaded from the database, and upon updating the database, determines again whether or not the data is updated by another transaction by comparing the stored updated time with the updated time of the data loaded from the database.

The database update management system can include a transaction monitoring unit for monitoring whether or not the transaction is completed. The transaction monitoring unit initiates the update processing of the database in response to detection of completion of the transaction.

The database update management system creates an update command using the sorted information specifying the updated data to issue the update command to the database.

As mentioned above, while the outline of the present invention has been described as the database update management system, the present invention can also be grasped as a method or a program (or a computer program product). The computer program product can include, for example, a storage medium that stores the above-mentioned program, or a medium for transmitting the program.

It should be noted that the above description of aspects of the present invention does not enumerate all of the features required for the present invention, and a combination of the components or a subcombination thereof could also be included in the present invention.

Figure 4:
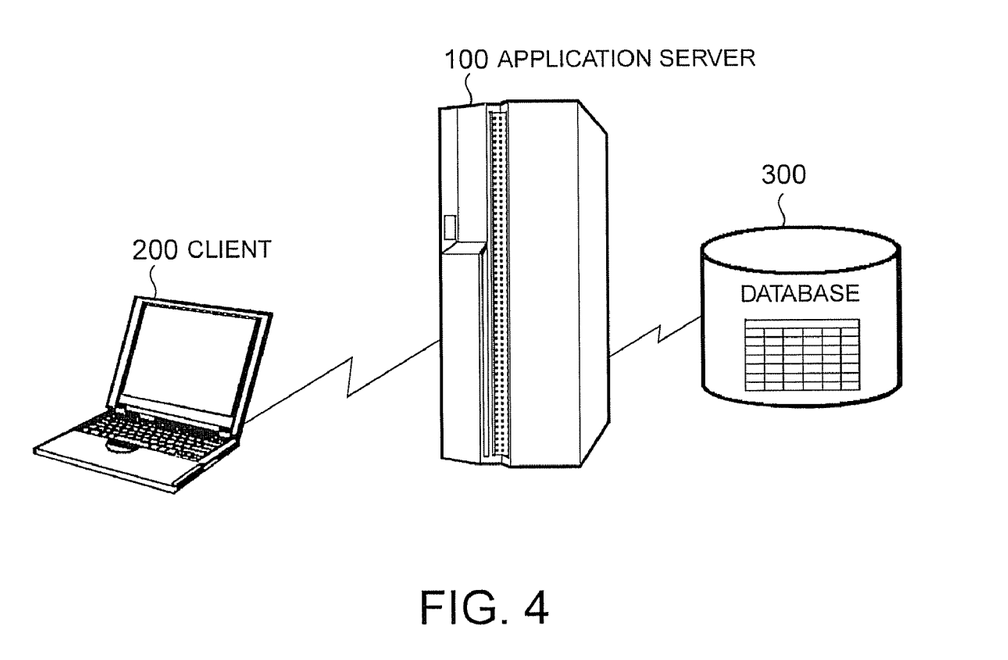
FIG. 4 illustrates an example of an overview of a database update management system according to an embodiment of the present invention.

FIG. 4 shows an example of an overview of a database update management system according to an embodiment of the present invention. An application server 100 is connected to a client computer 200 and a database 300. The database update management system functions as a part of the application server 100. A user invokes a database application from the client computer 200 to access to the database 300. The database update management system manages access from the database application to the database 300.

Figure 11:
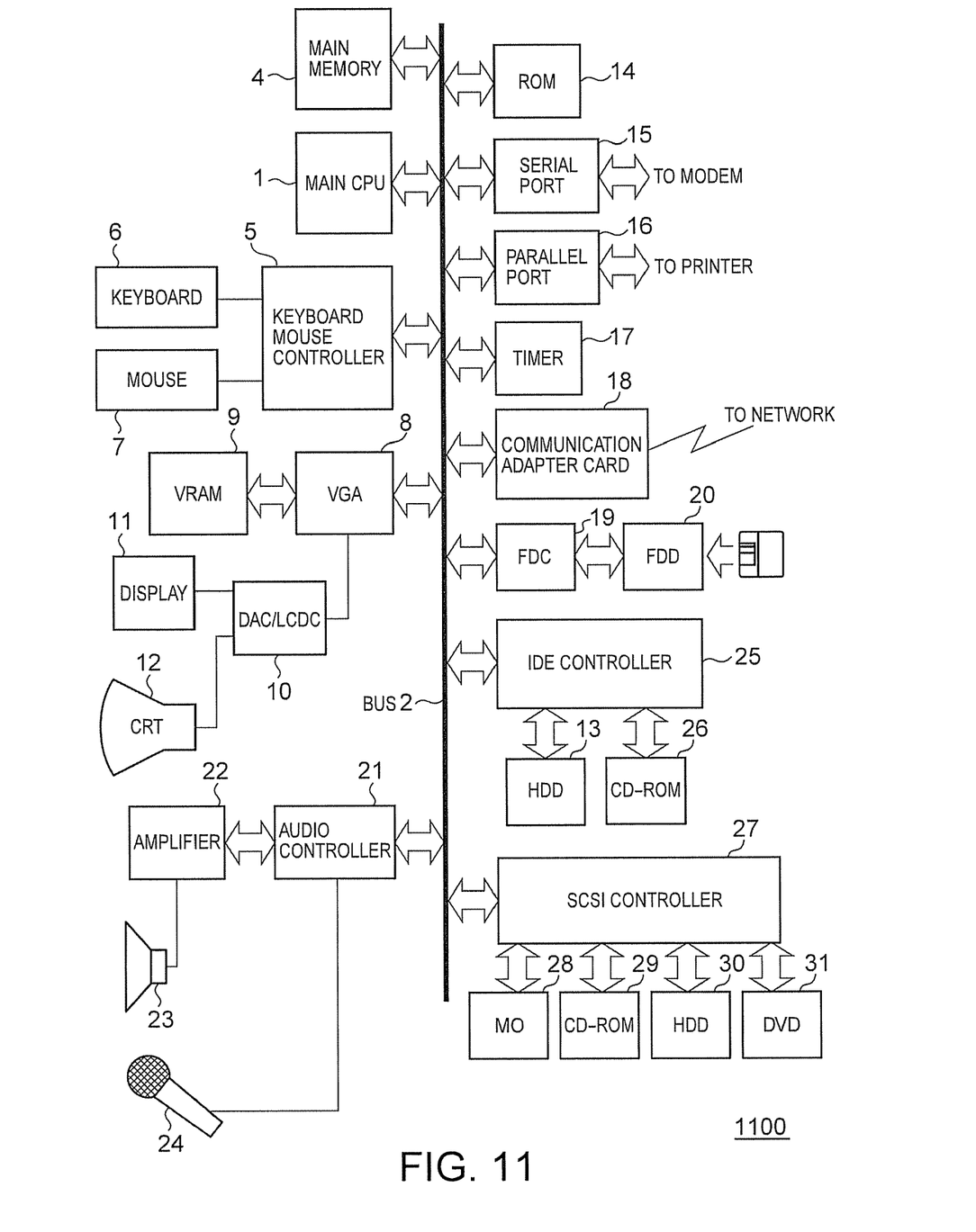
FIG. 11 illustrates an example of a hardware configuration of an information processing apparatus functioning as an application server and a client computer according to the embodiment of the present invention.

FIG. 11 exemplifies a hardware configuration of an information processing apparatus 1100 suitable for realizing the application server 100 and the client computer 200 according to the embodiment of the present invention. The information processing apparatus includes a central processing unit (CPU) 1 and a main memory 4. The CPU 1 and the main memory 4 are connected to a hard disk device 13 as an auxiliary memory through a bus 2. In addition, a removable storage (an external storage system in which a recording medium can be exchanged), such as a flexible disk drive 20, an MO drive 28, or CR-ROM drives 26 and 29, is connected to the bus 2 through an associated flexible disk controller 19, an IDE controller 25, or a SCSI controller 27.

The removable storage, such as the flexible disk drive 20, the MO drive 28, or the CR-ROM drives 26 and 29, has the storage medium, such as a flexible disk, an MO, a CD-ROM, respectively, inserted therein, and this flexible disk or the like, a hard disk drive 13, or a ROM 14 can record codes of a computer program for providing instructions to the CPU or the like cooperating with an operating system to carry out the present invention. The computer program is executed by being loaded to the main memory 4. The computer program can be compressed, or also be divided into a plurality of pieces to be recorded in a plurality of media.

The information processing apparatus can further have a pointing device 7 such as the mouse or the like, the keyboard 6, and a display 12 for presenting visual data to the user, as user interface hardware. Additionally, it is possible to connect it to a printer (not shown) through a parallel port 16, or to connect it a modem (not shown) through a serial port 15. The server 100 is connected to a network through the serial port 15 and the modem, or through a communication adapter 18 (such as an Ethernet (registered trademark) card or a token ring card) or the like, allowing communications to other computers or the like.

The loudspeaker 23 receives an audio signal subjected to D/A conversion (digital/analog conversion) by an audio controller 21 through an amplifier 22, and outputs it as an audio. In addition, the audio controller 21 makes it possible to A/D convert (analog/digital convert) audio information received from a microphone 24 to thereby take audio information external to the system into the system.

It will be readily understood from the explanation described above that the information processing apparatus in the embodiment of the present invention is achieved by an information processing apparatus, such as a mainframe, a workstation, or a general-purpose personal computer (PC), or a combination thereof. However, these components are illustrative and all of the components are not necessarily essential for the present invention.

Various modifications can be readily conceived by those skilled in the art, such as combining a plurality of machines and allocating functions to them for implementing the respective hardware components of the information processor used in the embodiment of the present invention, and these changes are naturally in the concept included in the thought of the present invention.

The application server 100 and the client computer 200 according to the embodiment of the present invention can employ, as the operating system, Windows® operating system provided by Microsoft Corporation, AIX® z/OS® provided by International Business Machines Corporation, Mac OS provided by Apple Computer Incorporated, or those which support a GUI multiwindow environment, such as Linux®.

In addition, the client computer 200 and the application server 100 can employ, as the operating system, those which support a character based environment, such as PC-DOS provided by International Business Machines Corporation or MS-DOS provided by Microsoft Corporation. Moreover, the client computer 200 and the application server 100 according to the embodiment of the present invention can also employ the operating system incorporated in a network computer, such as OS/Open provided by International Business Machines Corporation, a real-time OS such as Vx Works provided by Wind River Systems, Inc., or Java® OS.

As mentioned above, it will be understood that the client computer 200 and the application server 100 according to the embodiment of the present invention are not limited to a specific operating system environment. It will be obvious that the client computer 200 and the application server 100 may be operated in the operating system environments different from each other, respectively.

Figure 5:
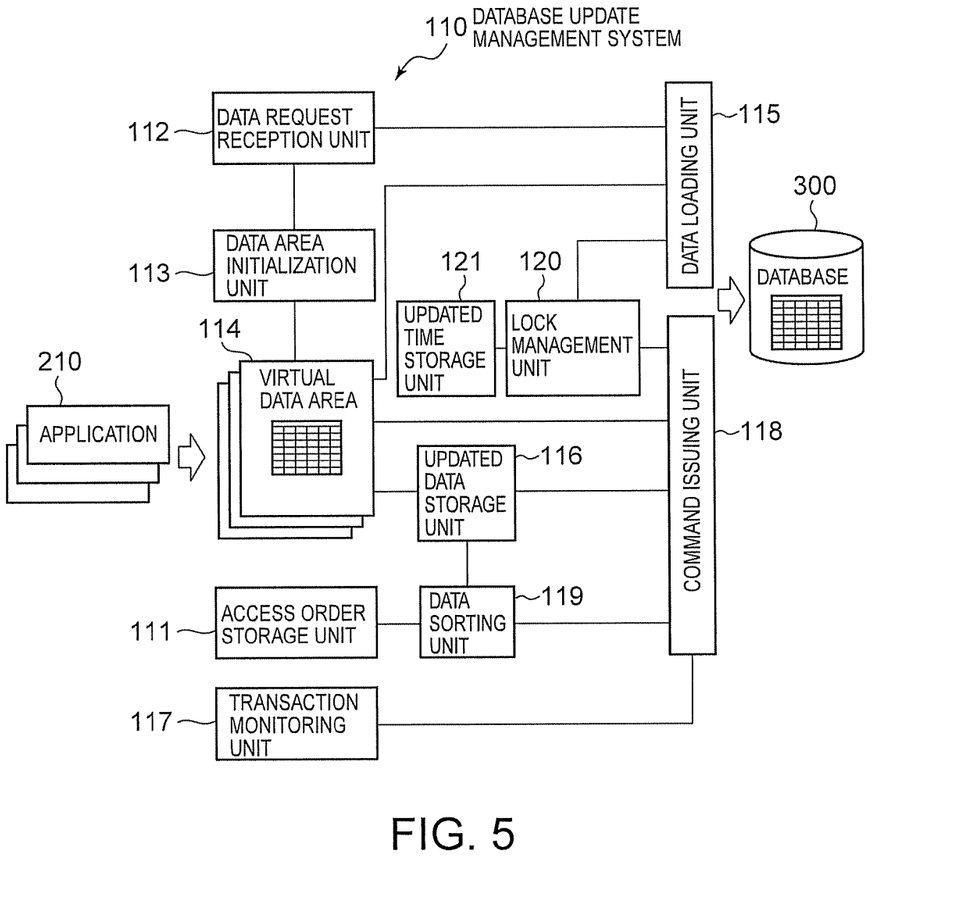
FIG. 5 illustrates the database update management system according to the embodiment of the present invention classified into functional blocks.

FIG. 5 shows a database update managing system 110 according to the embodiment of the present invention classified into functional blocks. Each element shown in the functional block diagram of FIG. 5 can be realized, in the information processing apparatus having the hardware configuration exemplified in FIG. 11, by loading the operating system or the computer program stored in the hard disk drive 13 or the like to be read into the CPU 1 to the main memory 14, and causing hardware resource and software to cooperate.

The database update management system 110 includes, an access order storage unit 111, a data request reception unit 112, a data area initialization unit 113, a virtual data area 114, a data loading unit 115, an updated data storage unit 116, a transaction monitoring unit 117, a command issuing unit 118, a data sorting unit 119, a lock management unit 120, and an updated time storage unit 121.

The access order storage unit 111 preliminarily stores an access order which represents a temporal order for accessing a plurality of tables in the database 300 in a process of updating tables in the database 300. The access order may be any order so long as the order is unique. For example, if there are three tables, a table T1, a table T2, and a table T3, and it is determined that they are accessed in that order, the access order storage unit 111 stores table names T1, T2, and T3 in that order.

The data request reception unit 112 receives, from a transaction of a database application 210, a data request on the data in the database 300 to be updated by the application. Thus, the update management system 110 can recognize that the application 210 requires the data in the table T1, for example.

The data loading unit 115 loads (i.e., copies) the data requested by the transaction from the database 300 to the virtual data area 114, in response to the data request reception unit 112 receiving the data request from the transaction of the application 210. In the step of loading the data based on the data request, the data loading unit 115 does not implement a physical lock for the target data provided by the DBMS (database management system).

Loading of data from the database 300 is preferably performed, every time the data request is received from the transaction on condition that the data subjected to the data request has not been loaded to the virtual data area 114.

However, based on consideration of available memory capacity or optimizing output/input from/to the database, the data loading unit 115 may be configured to collectively load all of the data requested by the transaction from the database 300, in response to initiation of the transaction. This can be realized by preliminarily storing a list of data required for the transaction and the data request reception unit 112 acquiring the list of data.

The data area initialization unit 113 initializes the virtual data area 114 where the data requested by the transaction should be loaded to set it to a state that the data could be loaded. The virtual data area 114 can be built as an instance on a Java® heap, for example. The transaction accesses and updates the data in the virtual data area 114. If the transaction has updated the data in the virtual data area 114, the update is not immediately reflected to the database 300, but held only in the virtual data area 114 until the transaction is completed. The update includes modification of the data, as well as deletion and insertion thereof.

If the transaction is constituted by a plurality of components, the components in the same transaction belong to the same thread. As for the data request from the components processing in the same transaction, the same virtual data area 114 is allocated and used. Thus, when one component which is executed first among the components belonging to the same transaction updates the data, the update management system 110 can provide the updated data to the component that is executed afterward, without loading the data from the database 300.

Figure 6:
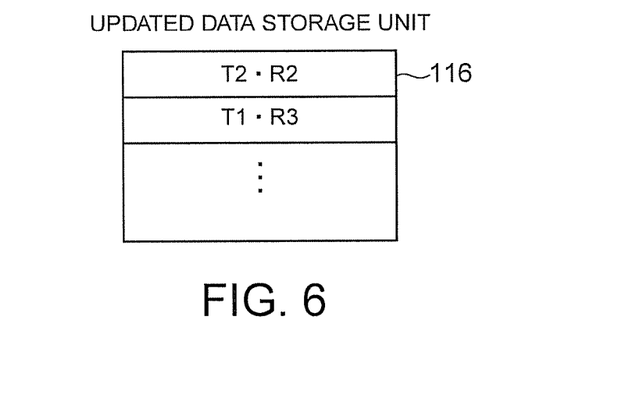
FIG. 6 illustrates a configuration example of an updated data storage unit according to the embodiment of the present invention.

The updated data storage unit 116 stores information specifying the updated data, if the data loaded to the virtual data area 114 is updated by the application 210. The information specifying the updated data is an identifier of the table or data record including the updated data, for example. FIG. 6 shows a configuration example of the updated data storage unit 116 according to the embodiment of the present invention. This example shows that a data record R2 of the table T2 has been updated, and a data record R3 of the table T1 has been subsequently updated.

Figure 7:
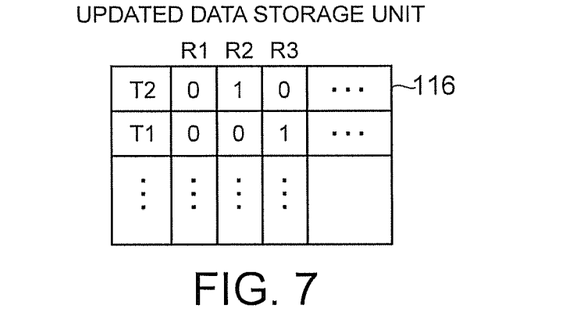
FIG. 7 illustrates another configuration example of the updated data storage unit according to the embodiment of the present invention.

FIG. 7 shows another configuration example in the form of an update table representing the updated data storage unit 116 according to the embodiment of the present invention. Each row of the update table pertains to a distinct table of the database and each column of the update table pertains to a distinct column of the tables in the database. Each intersection of a row and a column of the update table is denoted as a cell of the update table. Each cell of the update table corresponding to a record identified in the data request that has been updated in the virtual data area comprises an update flag ("1") designating that the record to which the cell corresponds has been updated in the virtual data area. Each cell of the update table corresponding to a record identified in the data request that has not been updated in the virtual data area comprises a non-update flag ("0") designating that the record to which the cell corresponds has not been updated in the virtual data area. This example in FIG. 7 shows, as with the configuration example of FIG. 6, that the data record R2 of the table T2 has been updated, then the data record R3 of the table T1 has been updated. The difference between this configuration example and the configuration example of FIG. 6 is that a flag area corresponding to each data record is provided in a storage area for the accessed table and that the updated data record is specified using the update flag. In this example in FIG. 7, the update flag is provided by data record, but the update flag may alternatively be provided by column.

The transaction monitoring unit 117 monitors whether or not the update transaction of the application is completed. In accordance with the detection of completion of the update transaction, the update processing of the database is initiated.

The command issuing unit 118 uses the completion of the update transaction as a trigger to collectively store the data updated by the transaction in the database 300. Storing in the database 300 is performed by issuing the update command, such as SQL, to the database. If the DBMS provides an optimization function for collectively updating in block, such as batch-update, the command issuing unit 118 can efficiently perform the storing to the database 300 using the function.

The update command may be issued in accordance with a predetermined access order in order to avoid occurrence of a deadlock. Issuance of the update command in accordance with the access order is realized in cooperation with the data sorting unit 119 described below.

The data sorting unit 119 sorts the information stored in the updated data storage unit 116 for specifying the data updated by the transaction in accordance with the access order stored in the access order storage unit 111.

Figure 8:
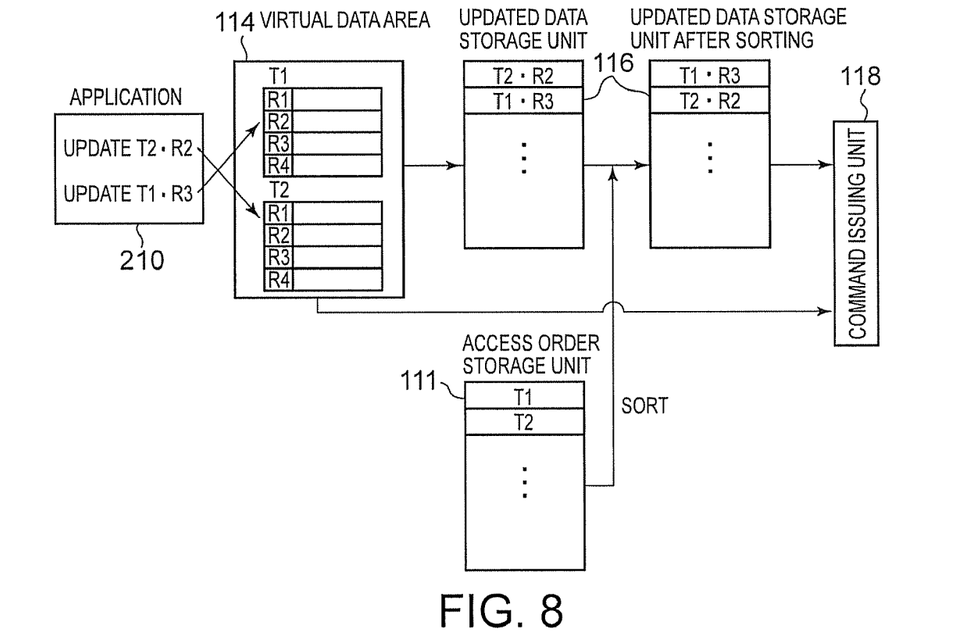
FIG. 8 illustrates a mechanism for storing data updated by a transaction in an arbitrary order to a database in accordance with a predetermined access order.

Referring to FIG. 8, there is described a mechanism for storing the data updated by the transaction in an arbitrary order to the database 300 in accordance with a predetermined access order. The access order storage unit 111 represents that the table T1 and the table T2 should be accessed in that order in the update processing of the tables. The application 210 is created without being conscious of that update order, and thus the application 210 first updates the data in the data record R2 of the table T2 in the virtual data area 114, and then updates the data in the data record R3 of the table T1. As a result, entries "T2•R2" and "T1•R3" are stored in the updated data storage unit 116 in the order updated by the application 210 in accordance with the transaction.

In response to the completion of the transaction, the data sorting unit 119 sorts contents of the updated data storage unit 116 in accordance with the order in the access order storage unit 111. The command issuing unit 118 creates the update command to be issued to the database 300 by referring to the sorted contents of the updated data storage unit 116 and fetching the data in the virtual data area 114.

Upon performing the update processing for the database, it is required to perform the exclusive control for the target data. However, as described above, the data loading unit 115 does not implement the physical lock on the database 300 for the data identified in the data request upon loading the data from the database 300 based on the data request from the transaction. Then, it is required to realize the exclusive control using another method upon performing the update processing for the database 300. In the embodiment of the invention, the lock management unit 120 provides an exclusive control function.

The lock management unit 120 determines whether or not the data loaded from the database 300 has been updated by another transaction on the database 300 while the data is processed by the transaction. Upon loading the data requested by the transaction from the database 300, the lock management unit 120 also loads the time, indicating when the data has been previously updated, held on the database 300. The lock management unit 120 stores the acquired updated time in the updated time storage unit 121 connected to the lock management unit.

Figure 9:
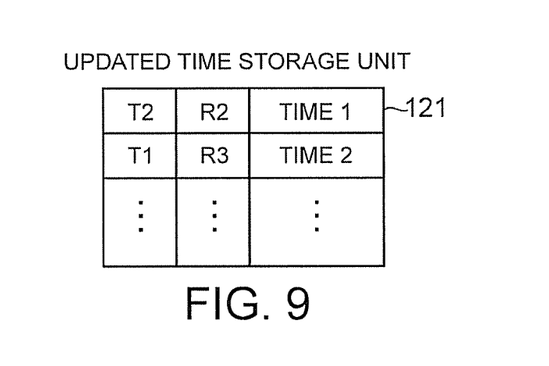
FIG. 9 illustrates a configuration example of an updated time storage unit according to the embodiment of the present invention.

FIG. 9 shows a configuration example of the updated time storage unit 121 according to the embodiment of the present invention. In this example, the data record R2 of the table T2 and the data record R3 of the table T1 have been loaded from the database 300. FIG. 9 also represents that the data record R2 of the table T2 and the data record R3 of the table T1 have been previously updated at time 1 and time 2, respectively, on the database 300. The times of time 1 and time 2 are latest times that the data record R2 of the table T2 and the data record R3 of the table T1, respectively, have been previously updated in the database 300.

When intended to reflect the data record R2 of the table T2 updated by the transaction to the database 300, the lock management unit 120 again loads updated time 3 of the data record R2 from the database 300. The lock management unit 120 then compares the updated time 1 stored in the updated time storage unit 121 with the newly acquired updated time 3. If time 3 is equal to time 1, then the lock management unit 120 determines that the data record has not been updated by another transaction. In contrast, if, time 3 is unequal to time 1, then the lock management unit 120 determines that the data record has been updated by another transaction.

Figure 10:
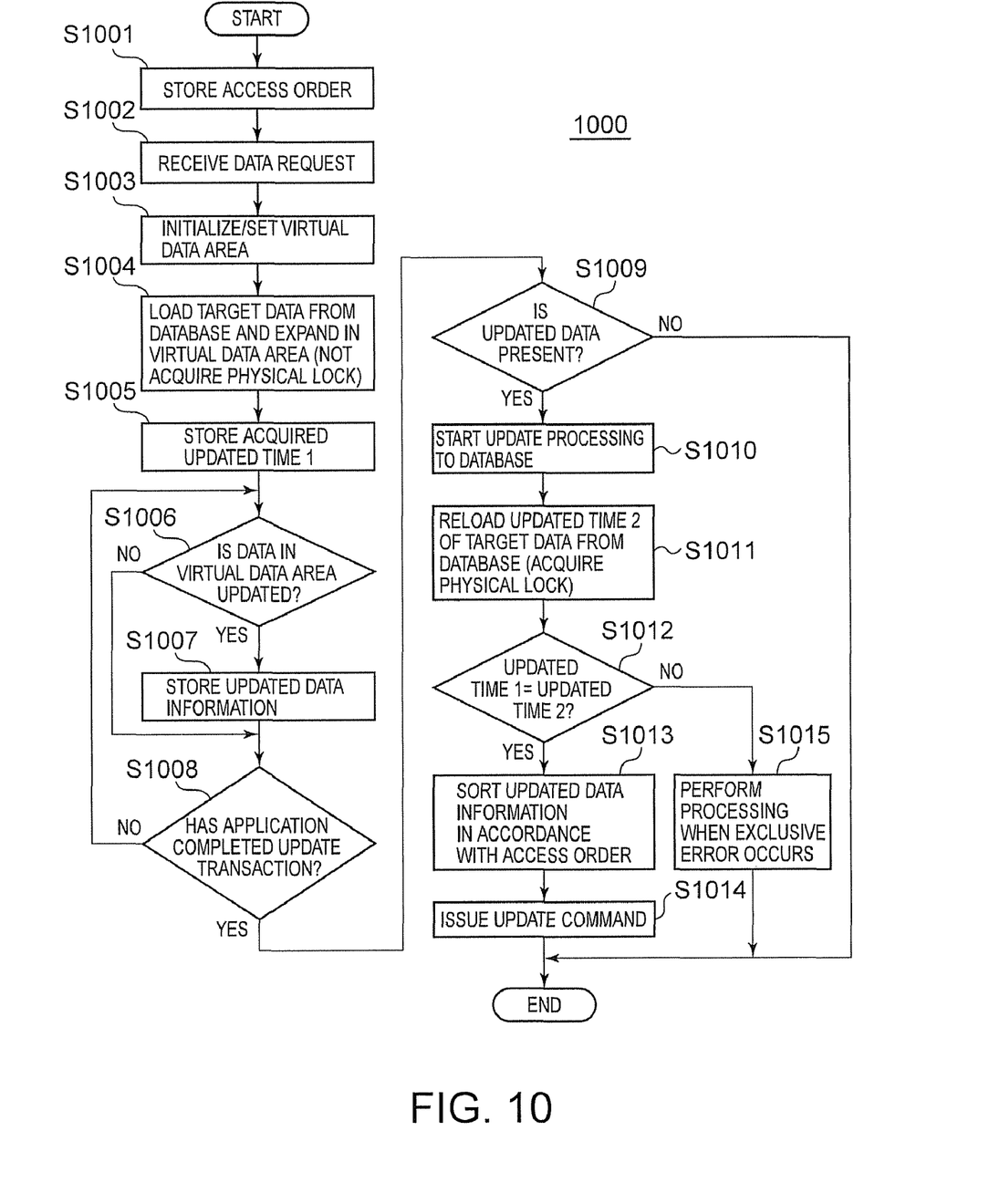
FIG. 10 is a flow chart showing update processing of the database according to the embodiment of the present invention.

FIG. 10 is a flow chart 1000 representing the update processing of the database according to the embodiment of the present invention. The processing is started at Step 1001, by preliminarily determining the access order to the plurality of tables of the database 300 and storing the access order in the access order storage unit 111.

The data request reception unit 112 receives the data request on the data to be updated in the database 300 from the transaction (Step 1002). The data request specifies records of tables to be updated in the database 300. In response to the data request reception unit 112 receiving the data request, the data area initialization unit 113 initializes/sets the virtual data area 114 in which the data subjected to the data request is to be stored (Step 1003).

Also, in response to the data request reception unit 112 receiving the data request, the data loading unit 115 loads (i.e., copies) the data subjected to the data request from the database 300 to the virtual data area 114 (Step 1004). At this step, the physical lock for the exclusive control is not acquired. Instead, upon loading the data from the database 300, the data loading unit 115 also loads the latest updated time of the data in the database 300, and stores the latest updated time in the updated time storage unit 121 connected to the lock management unit 120 (Step 1005).

The application 210 accesses and updates the data stored in the virtual data area 114. At Step 1006, the program for managing the virtual data area 114 monitors whether or not the data in the virtual data area 114 is updated by the transaction of the application 210. If it is detected that the data is updated (YES at Step 1006), the program for managing the virtual data area 114 stores the information specifying the updated data in the updated data storage unit 116 (Step 1007). The processing then proceeds to Step 1008. In contrast, if the data is not updated (NO at Step 1006), the processing directly proceeds to Step 1008.

At Step 1008, the transaction monitoring unit 117 monitors whether or not the transaction is completed with respect to the data in the virtual data area 114 having been updated in accordance with the data request as indicated in the updated data storage unit 116. If the transaction monitoring unit 117 detects the completion of the update transaction (YES at Step 1008), the processing proceeds to Step 1009, and the update processing for the database 300 is initiated (Step 1010) on condition that the updated data is present (YES at Step 1009). If the updated data is not present, the processing is ended. In contrast, if the transaction monitoring unit 117 does not detect the completion of the update transaction (No at Step 1008), the processing returns to Step 1006 to wait for the completion of the transaction.

In response to the update processing for the database 300 being initiated, the lock management unit 120 acquires the updated time of the data as the update target from the database 300 through the data loading unit 115 (Step 1011). At this time, the physical lock provided by the DBMS on the database 300 for the data identified in the data request is implemented. The lock management unit 120 determines whether or not the acquired updated time equal to the updated time stored in the updated time storage unit (Step 1012). If the two times are equal to each other (YES at Step 1012), it means that the data has not been updated on the database 300 by another transaction from a time when the data has been acquired from the database 300 to the present, so that the processing proceeds to Step 1013 and the update command for the database 300 is prepared.

In contrast, if the two updated times are not equal to each other (NO at Step 1012), it means that the data has been updated by another transaction, so that the processing proceeds to Step 1015. At Step 1015, the processing when an exclusive error occurs, which is preliminarily set up, is performed. This setup content is generally determined upon designing the application, and the setup is performed upon execution using a definition file or the like for the database update management system. Examples of the processing upon occurrence of the exclusive error include issuance of a rollback, extortion of the update regardless of occurrence of the exclusive error, or the like.

At Step 1013, the data sorting unit 119 sorts the information specifying the updated data stored in the updated data storage unit 116 in accordance with the access order stored in the access order storage unit 111. The command issuing unit 118 then creates and issues the update command to the database 300 by referring to the sorted information and fetching the data in the virtual data area 114 (Step 1014).

As described above, according to the present invention, in order to reduce the frequency of occurrences of the deadlocks, the database can be updated, without communicating to the DBMS of the database the temporal order in the access order of updating tables of the database, if it is required for the transaction to update the database in a predetermined order, while the update can be realized in accordance with the order for the physical database.

The present invention can be accomplished as hardware, software, or a combination of hardware and software. In an execution using the combination of the hardware and software, an illustrative example includes the execution in the data processing system having a predetermined program. In this case, by the predetermined program being loaded to the data processing system and executed, the program controls the data processing system and performs the processing according to the present invention. This program is constituted of a group of instructions which can be expressed by arbitrary language, code, and notations. Such a group of instructions allows the system to execute a certain function directly or after either or both of (1) conversion to a different language, code, or notation, and (2) duplication to a different medium is carried out.

The present invention apparently includes not only such a program itself but also the medium which recorded the program in its scope. The program for executing the function of the present invention can be stored in any computer-readable recording media such as a flexible disk, MO, CD-ROM, DVD, hard disk device, ROM, MRAM, RAM or the like. The program can be downloaded from other data processing systems connected through a communication line, or reproduced from other recording media for the storage in the recording medium. The program product can also be compressed or divided into plurality to be stored in a single recording medium or multiple recording media. In addition, it should be noted that the computer program product for carrying out the present invention could be apparently provided in various forms as well. Thus, the computer program product comprises a computer readable storage medium having a computer readable program code stored therein, said computer readable program code containing instructions that when executed by a processor of the information processing apparatus implement a method for managing a transaction for updating tables of a database comprising a plurality of tables.

It is apparent to those skilled in the art that various modifications or improvements can be made to the embodiments described above. Naturally, the mode to which such a modification or improvement is added is also included in the technical scope of the present invention.

As mentioned above, the present invention has been described using the embodiments, but the technical scope of the present invention is not limited to the scope described in the aforementioned embodiments. It is apparent to those skilled in the art that various modifications or improvements can be made to the embodiments described above. Naturally, the mode to which such a modification or improvement is added is also included in the technical

What is claimed is:

1. A method for managing a transaction for updating tables of a database comprising a plurality of tables, said method comprising:

storing, in an access order storage unit, an access order specifying a temporal order in which the tables of the plurality of tables are to be updated in the database, wherein each table of the plurality of tables is identified by a respective table identifier, wherein the temporal order is expressed in the access order as a sequential ordering of the table identifiers of the tables of the plurality of tables, wherein the tables identified by the table identifiers in the access order are to be updated in a same sequential ordering in time as the sequential ordering of the respective table identifiers in the access order, and wherein a database update management system comprises the access order storage unit and an updated data storage area, and wherein said storing the access order is performed by a processor of an information processing apparatus;

after said storing the access order, said processor receiving a data request specifying records in the database to be updated in the database for the transaction, said records to be updated being comprised by the plurality of tables of the database;

after said receiving the data request, said processor copying the records identified in the data request from the database to a virtual data area;

after said copying, said processor determining from a list of updated records in the updated data storage area that the records identified in the data request have been updated in the virtual data area, said list of updated records specifying updated records of tables of the database in a chronological order in which the updated records have been updated in the virtual data area in accordance with the data request;

after said determining that the records identified in the data request have been updated in the virtual data area, said processor ascertaining that each record identified in the data request has not been updated in the database since said copying was performed;

after said ascertaining, said processor sorting the list of updated records in accordance with the temporal order in the access order to generate a list of sorted records in the updated data storage area, wherein the records in list of sorted records are sequentially ordered in accordance with the sequential ordering of the table identifiers in the access order; and said processor updating the database by replacing in the database the records identified in the list of sorted records by corresponding updated records in the virtual data area, said records being replaced in the database in a time order corresponding to an order in which the updated records appear in the list of sorted records.

2. The method of claim 1,
wherein the database update management system further comprises an updated time storage unit and a lock management unit;
wherein the method further comprises upon performing said copying, said processor storing in the updated time storage unit a latest time prior to said copying that each record identified in the data request was updated in the database; and
wherein said ascertaining comprises:
acquiring, by the lock management unit, a most recent time prior to said copying that each record identified in the data request was updated in the database; and
ascertaining, by the lock management unit, that the most recent time is equal to the latest time for each record identified in the data request.

3. The method of claim 2, wherein the method further comprises when said acquiring a most recent time is performed:
said processor implementing a lock on the database for the data identified in the data request.

4. The method of claim 1, wherein during said copying, a lock on the database for the data identified in the data request is not implemented.

5. The method of claim 1, wherein the method does not comprise communicating the temporal order to a database management system of the database.

6. The method of claim 1, wherein the method further comprises prior to said copying:
said processor building the virtual data area as an instance of a heap.

7. The method of claim 1, wherein the data request for the transaction is from a plurality of components, wherein the records identified in the data request have been updated in the virtual data area by the plurality of components, and wherein the components of the plurality of components belong to a same thread.

8. The method of claim 1,
wherein the list of updated records is an update table of rows and columns,
wherein each row of the update table pertains to a distinct table of the database and each column of the update table pertains to a distinct column of the tables in the database,
wherein each intersection of a row and a column of the update table is denoted as a cell of the update table,
wherein each cell of the update table corresponding to a record identified in the data request that has been updated in the virtual data area comprises an update flag designating that the record to which the cell corresponds has been updated in the virtual data area, and
wherein each cell of the update table corresponding to a record identified in the data request that has not been updated in the virtual data area comprises a non-update flag designating that the record to which the cell corresponds has not been updated in the virtual data area.

9. A database update management system comprising an access order storage unit and an updated data storage area, said system configured to perform a method for managing a transaction for updating tables of a database comprising a plurality of tables by executing program code on a processor of an information processing apparatus, said method comprising:
storing, in the access order storage unit, an access order specifying a temporal order in which the tables of the plurality of tables are to be updated in the database, wherein each table of the plurality of tables is identified by a respective table identifier, wherein the temporal order is expressed in the access order as a sequential ordering of the table identifiers of the tables of the plurality of tables, wherein the tables identified by the table identifiers in the access order are to be updated in a same sequential ordering in time as the sequential ordering of the respective table identifiers in the access order;
after said storing the access order, receiving a data request specifying records in the database to be updated in the database for the transaction, said records to be updated being comprised by the plurality of tables of the database;
after said receiving the data request, copying the records identified in the data request from the database to a virtual data area;
after said copying, determining from a list of updated records in the updated data storage area that the records identified in the data request have been updated in the virtual data area, said list of updated records specifying updated records of tables of the database in a chronological order in which the updated records have been updated in the virtual data area in accordance with the data request;
after said determining that the records identified in the data request have been updated in the virtual data area, ascertaining that each record identified in the data request has not been updated in the database since said copying was performed;
after said ascertaining, sorting the list of updated records in accordance with the temporal order in the access order to generate a list of sorted records in the updated data storage area, wherein the records in list of sorted records are sequentially ordered in accordance with the sequential ordering of the table identifiers in the access order; and
updating the database by replacing in the database the records identified in the list of sorted records by corresponding updated records in the virtual data area, said records being replaced in the database in a time order corresponding to an order in which the updated records appear in the list of sorted records.

10. The system of claim 9,
wherein the database update management system further comprises an updated time storage unit and a lock management unit;
wherein the method further comprises upon performing said copying, storing in the updated time storage unit a latest time prior to said copying that each record identified in the data request was updated in the database; and
wherein said ascertaining comprises:
acquiring, by the lock management unit, a most recent time prior to said copying that each record identified in the data request was updated in the database; and
ascertaining, by the lock management unit, that the most recent time is equal to the latest time for each record identified in the data request.

11. The system of claim 10, wherein the method further comprises when said acquiring a most recent time is performed:
implementing a lock on the database for the data identified in the data request.

12. The system of claim 9, wherein the method further comprises prior to said copying:
building the virtual data area as an instance of a heap.

13. The system of claim 9, wherein the data request for the transaction is from a plurality of components, wherein the records identified in the data request have been updated in the virtual data area by the plurality of components, and wherein the components of the plurality of components belong to a same thread.

14. The system of claim 9,
wherein the list of updated records is an update table of rows and columns,
wherein each row of the update table pertains to a distinct table of the database and each column of the update table pertains to a distinct column of the tables in the database,
wherein each intersection of a row and a column of the update table is denoted as a cell of the update table,
wherein each cell of the update table corresponding to a record identified in the data request that has been updated in the virtual data area comprises an update flag designating that the record to which the cell corresponds has been updated in the virtual data area, and
wherein each cell of the update table corresponding to a record identified in the data request that has not been updated in the virtual data area comprises a non-update flag designating that the record to which the cell corresponds has not been updated in the virtual data area.

15. A computer program product, comprising a computer readable storage device having a computer readable program code stored therein, said computer readable program code containing instructions that when executed by a processor of an information processing apparatus implement a method for managing a transaction for updating tables of a database comprising a plurality of tables, said method comprising:
storing, in the access order storage unit, an access order specifying a temporal order in which the tables of the plurality of tables are to be updated in the database, wherein each table of the plurality of tables is identified by a respective table identifier, wherein the temporal order is expressed in the access order as a sequential ordering of the table identifiers of the tables of the plurality of tables, wherein the tables identified by the table identifiers in the access order are to be updated in a same sequential ordering in time as the sequential ordering of the respective table identifiers in the access order;
after said storing the access order, receiving a data request specifying records in the database to be updated in the database for the transaction, said records to be updated being comprised by the plurality of tables of the database;
after said receiving the data request, copying the records identified in the data request from the database to a virtual data area;
after said copying, determining from a list of updated records in the updated data storage area that the records identified in the data request have been updated in the virtual data area, said list of updated records specifying updated records of tables of the database in a chronological order in which the updated records have been updated in the virtual data area in accordance with the data request;
after said determining that the records identified in the data request have been updated in the virtual data area, ascertaining that each record identified in the data request has not been updated in the database since said copying was performed;
after said ascertaining, sorting the list of updated records in accordance with the temporal order in the access order to generate a list of sorted records in the updated data storage area, wherein the records in list of sorted records are sequentially ordered in accordance with the sequential ordering of the table identifiers in the access order; and
updating the database by replacing in the database the records identified in the list of sorted records by corresponding updated records in the virtual data area, said records being replaced in the database in a time order corresponding to an order in which the updated records appear in the list of sorted records.

16. The computer program product of claim 15,
wherein the database update management system further comprises an updated time storage unit and a lock management unit;
wherein the method further comprises upon performing said copying, storing in the updated time storage unit a latest time prior to said copying that each record identified in the data request was updated in the database; and
wherein said ascertaining comprises:
acquiring, by the lock management unit, a most recent time prior to said copying that each record identified in the data request was updated in the database; and
ascertaining, by the lock management unit, that the most recent time is equal to the latest time for each record identified in the data request.

17. The computer program product of claim 16, wherein the method further comprises when said acquiring a most recent time is performed:
implementing a lock on the database for the data identified in the data request.

18. The computer program product of claim 15, wherein the method further comprises prior to said copying:
building the virtual data area as an instance of a heap.

19. The computer program product of claim 15, wherein the data request for the transaction is from a plurality of components, wherein the records identified in the data request have been updated in the virtual data area by the plurality of components, and wherein the components of the plurality of components belong to a same thread.

20. The computer program product of claim 15,
wherein the list of updated records is an update table of rows and columns,
wherein each row of the update table pertains to a distinct table of the database and each column of the update table pertains to a distinct column of the tables in the database,
wherein each intersection of a row and a column of the update table is denoted as a cell of the update table,
wherein each cell of the update table corresponding to a record identified in the data request that has been updated in the virtual data area comprises an update flag designating that the record to which the cell corresponds has been updated in the virtual data area, and
wherein each cell of the update table corresponding to a record identified in the data request that has not been updated in the virtual data area comprises a non-update flag designating that the record to which the cell corresponds has not been updated in the virtual data area.

* * * * *